J. W. McKITRICK.
FASTENER.
APPLICATION FILED JUNE 21, 1909.
975,266.
Patented Nov. 8, 1910.
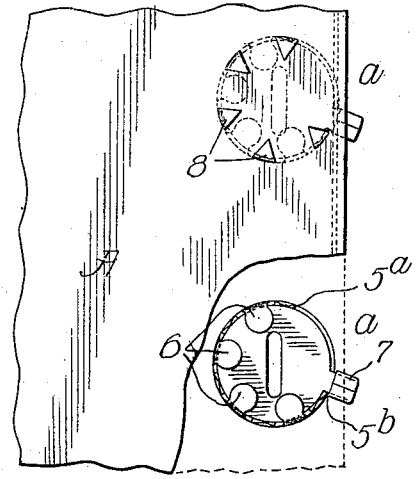
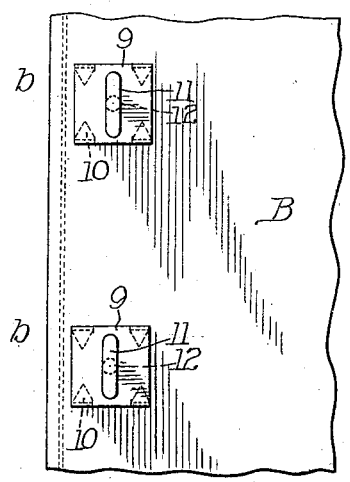
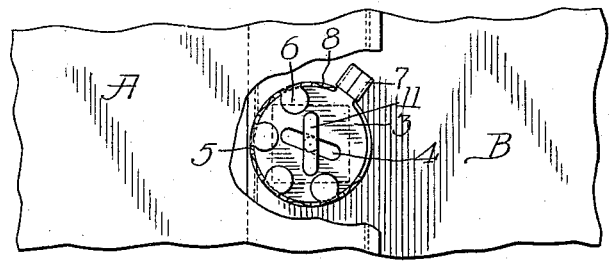
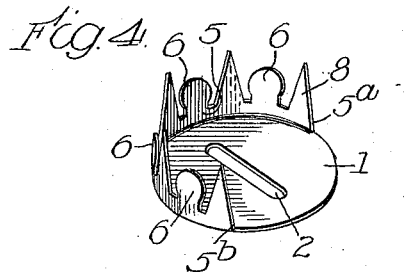
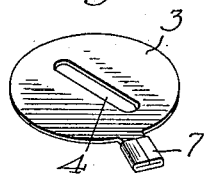
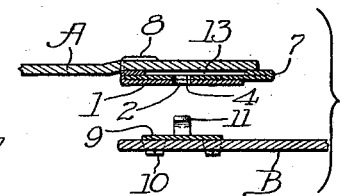
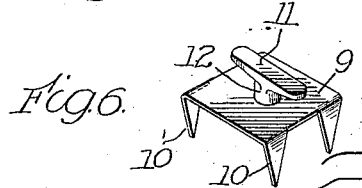
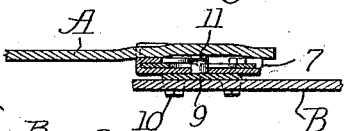
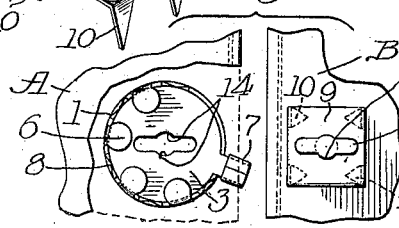

UNITED STATES PATENT OFFICE.

JOHN WESLEY McKITRICK, OF ST. CHARLES, ILLINOIS.

FASTENER.

975,266.   Specification of Letters Patent.   Patented Nov. 8, 1910.

Application filed June 21, 1909. Serial No. 503,333.

*To all whom it may concern:*

Be it known that I, JOHN WESLEY MC-KITRICK, a citizen of the United States, residing at St. Charles, in the county of Kane and State of Illinois, have invented certain new and useful Improvements in Fasteners, of which the following is a specification.

The object of this invention is the production of a fastener suitable for use upon shoes, gloves, belts, and the like, which shall be of strong and simple construction, which shall occupy but little space, and which shall be readily operable to fasten or unfasten the device upon which it may be used.

In the accompanying drawings, Figure 1 is a top plan view of a part such as the button-hole piece of a shoe, a fastener member being indicated thereon in dotted lines, and a portion being broken away to illustrate another fastener member in top plan view. Fig. 2 is a fragmental top plan view of a shoe upper illustrating fastener members adapted to coöperate with the members upon the part illustrated in Fig. 1. Fig. 3 is a view illustrating the two parts secured together and the fastener in closed position. Figs. 4 and 5 are detail perspective views of the parts comprised in one of the fastener members. Fig. 6 is a perspective view of the other fastener member. Fig. 7 is a transverse section through two parts to be united, showing the position of the fastener members when disengaged. Fig. 8 is a similar view showing the fastener members engaged.
Fig. 9 is a view on the order of Figs. 1 and 2, showing a slightly modified form of the fastener.

In the drawings, A may designate a part corresponding to the button-hole piece of a shoe, and B a portion of the upper upon which buttons are mounted in prior constructions. The member $a$ of the fastener is mounted upon the under side of the part A and comprises a plate 1 which, as herein shown, may take the form of a disk, said plate having an elongated central opening 2 therein. Rotatably mounted upon the disk 1 is a disk 3 having therein a central elongated opening 4 of the same size and form as the opening 2, and arranged to be brought into register with said opening 2. In this instance, the disk 3 is held in place upon the disk 1, with freedom to turn through a partial rotation, by means of an up-standing flange 5 extending around approximately four-fifths of the circumference of the disk 1. The flange 5 is about the same height as the thickness of the disk 3. Lugs 6 upon the edge of the flange 5 are bent to overlie the disk 3 and retain said disk from lateral displacement with relation to the disk 1. The disk 3 may be turned by means of a handle 7 located upon the periphery of said disk and formed in any suitable manner. The ends $5^a$ $5^b$ of the flange 5 constitute stops to limit the movement of the handle 7 and the disk 3.

Fastener members $a$ may be secured to the part A in any suitable manner, as, for example, by means of tangs 8 formed upon the flange 5, and adapted to pass through a strip or layer comprised in the part A and be bent to retain the members $a$ in place. Preferably each member $a$ is mounted upon the part A so that when the openings 2 and 4 are in register said openings extend longitudinally of the adjacent edge of the part A.

The member $b$ of the fastener consists of a plate 9 which may be secured to the part B in any suitable manner, as, for instance, by means of tangs 10 upon the edges of said plate. The plate 9 may be of any suitable outline, but when punched from a strip of metal it is most conveniently made square, as shown in Figs. 2 and 6. Upon the upper side of the plate 9 is an elongated head 11 carried by a neck 12. Said neck and head are adapted to extend through the openings 2 and 4 and be secured therein by rotation of the disk 3 with relation to the disk 1.

Referring now to Figs. 7 and 8: Assuming that the disk 3 is in such position that the opening 4 therein registers with the opening 2, the parts A and B may be secured together by inserting the head 11 through said openings and into the space 13 between the disk 3 and the material constituting the part A. The operator then rotates the disk 3 by means of the handle 7 to carry the opening 4 out of register with the opening 2 and into the position indicated in Figs. 3 and 8, thereby confining the head 11 in the space 13 and securing the parts A and B together. Said parts may be disengaged by rotating the disk 3 into its original position, whereupon the pressure exerted by the foot upon the parts A and B immediately causes said parts to spring away from each other. It will be seen that the separating movement of the parts A and B is in a direction transverse to the length of the registering openings 2 and 4.

The neck 12 being of the same width as the head 11, said neck guides the head out of the registering openings 2 and 4 and prevents said head from fouling upon the long sides of said openings.

Another form of the fastener is illustrated in Fig. 9. In this form the registering openings 2 and 4 extend in the direction of the pull upon the parts A and B when said parts separate. To prevent the head 11$^a$ from catching upon the end walls of said openings when the fastener is to be released, I make the neck 12$^a$ of greater diameter or width than the width of the head 11$^a$, the openings in the disks 1 and 3 being centrally enlarged as at 14 to receive said neck. When the disk 3 is rotated to bring the openings in disks 1 and 3 into register, the head is guided out of said openings and prevented from fouling upon the end walls thereof by means of the neck 12$^a$, said neck being compelled to move out through the enlarged central portion 14 of said opening.

I would have it understood that various changes may be made in the size, proportion and relative arrangements of the parts herein shown without departing from the spirit and scope of the invention as defined by the appended claims.

I claim as my invention:

1. A fastener consisting of two members, one of said members comprising a base plate having means projecting from one side thereof for attaching it to an article, a flat circular disk lying in direct contact with and rotatably confined upon the same side of said base plate, and means on said disk for turning it upon a central axis, said base plate and said disk having centrally-arranged elongated openings therein which are adapted to register, and the other fastener member being a stud having a flat, relatively thin T-head adapted to pass through said elongated openings.

2. The combination of two parts to be fastened together; a fastener member comprising a round flat base plate having on one side a flange which extends part way around the plate, and a plurality of lugs and attaching tangs on the edge of said flange, by means of which tangs said fastener member is secured to one of the parts to be fastened together, and which lugs are bent to lie in a plane substantially parallel with the plate, a disk lying in contact with the flanged side of said base plate and held by said lugs and said flange against displacement, means on said disk for turning it on a central axis, the ends of said flange constituting stops to limit the turning movements of said disk, said plate and said disk having centrally-arranged elongated openings adapted to register; and a stud member having a flat, relatively thin T-head adapted to pass through the registering openings and lie at the flanged side of said base plate, said head and said openings when in register extending longitudinally of the adjacent edges of the parts to be fastened together.

JOHN WESLEY McKITRICK.

Witnesses:
C. PAUL PARKER,
GEORGE L. CHINDAHL.